(12) United States Patent  (10) Patent No.: US 7,523,976 B1
Severson  (45) Date of Patent: Apr. 28, 2009

(54) TOP SUPPORT AND VEHICLE EQUIPPED WITH SAME

(76) Inventor: Jeffrey W. Severson, 1129 Bayview Ave., Rice Lake, WI (US) 54868

( * ) Notice: Subject to any disclaimer, the term of this patent is extended or adjusted under 35 U.S.C. 154(b) by 38 days.

(21) Appl. No.: 11/738,591

(22) Filed: Apr. 23, 2007

Related U.S. Application Data

(60) Provisional application No. 60/745,827, filed on Apr. 27, 2006.

(51) Int. Cl.
*B60J 1/02* (2006.01)

(52) U.S. Cl. .......................... 296/107.01; 296/107.12; 296/107.13; 296/107.14

(58) Field of Classification Search ............... 296/77.1, 296/78.1, 107.01, 109, 111, 121, 122, 107.09, 296/107.12, 107.13, 107.14
See application file for complete search history.

(56) References Cited

U.S. PATENT DOCUMENTS

| 930,641 | A | 8/1909 | Brethouwer | |
|---|---|---|---|---|
| 950,038 | A | 2/1910 | Bliss | |
| 1,163,632 | A | 12/1915 | Anderson | |
| 1,273,710 | A | 7/1918 | Winans | |
| 1,313,772 | A | 8/1919 | Winans | |
| 1,800,514 | A | 4/1931 | Dupre | |
| 2,076,243 | A | 4/1937 | Marshall et al. | |
| 2,279,541 | A | 4/1942 | Westrope | |
| 2,367,541 | A | 1/1945 | Troendle | |
| 4,091,484 | A * | 5/1978 | Means ........................ | 114/361 |
| 5,556,156 | A | 9/1996 | Kirk | |
| 5,961,175 | A | 10/1999 | Clardy, Jr. | |
| 6,206,446 | B1 | 3/2001 | Slayden | |
| 6,288,511 | B2 | 9/2001 | Porter et al. | |
| 6,416,108 | B1 | 7/2002 | Elswick | |
| 6,439,645 | B1 * | 8/2002 | Pedersen ..................... | 296/161 |
| 6,682,123 | B2 | 1/2004 | Burks et al. | |
| 6,811,204 | B2 | 11/2004 | Long | |
| 6,811,206 | B2 | 11/2004 | Wagner | |
| 6,817,647 | B1 | 11/2004 | Green | |
| 2002/0070580 | A1 * | 6/2002 | Elswick ................... | 296/96.21 |

* cited by examiner

*Primary Examiner*—Joseph D Pape
(74) *Attorney, Agent, or Firm*—Anthony J. Bourget (57) ABSTRACT

A vehicle, and a support device used in conjunction with a vehicle top enclosure for enclosing a top portion of a vehicle, the support device comprising a front catch positioned forward a steering mechanism of the vehicle and a first arm pivotally connected to the device, the first arm including a telescoping vehicle front connecting portion, the front connecting portion configured to engage the front catch. Further aspects include a tensioner configured with the first arm to engage the catch. A pliable cover may be included to complete the top enclosure and associated vehicle.

18 Claims, 8 Drawing Sheets

TOP SUPPORT AND VEHICLE EQUIPPED WITH SAME

CROSS-REFERENCE TO RELATED APPLICATIONS, IF ANY

Applicant claims priority based on Provisional Patent Application No. 60/745,827, filed Apr. 27, 2006, which is hereby incorporated by reference in its entirety.

BACKGROUND OF THE INVENTION

1. Field of the Invention

The present invention relates generally to vehicles and vehicle top supports, and more specifically to top supports or foldable enclosures used on ATVs and other vehicles.

2. Background Information

Vehicles, including smaller vehicles such as All-Terrain-Vehicles (ATVs), are used for work and recreation. They may be used in a variety of situations and can traverse all types of terrain. Typically an ATV has an exposed top or passenger area, which makes use of the vehicle difficult or unpleasant when operating in inclement weather. Tops and enclosures for use on vehicles, including for use on ATVs, are common. Examples of vehicle tops or enclosure conveyor devices, including foldable enclosures, are presented in a number of U.S. patents, including U.S. Pat. No. 6,416,108 to Elswick; U.S. Pat. No. 5,961,175 to Clardy, Jr.; U.S. Pat. No. 6,811,204 to Long; U.S. Pat. No. 6,206,446 to Slayden; U.S. Pat. No. 6,817,647 to Green; U.S. Pat. No. 6,682,123 to Burks et al.; U.S. Pat. No. 2,279,541 to Westrope; U.S. Pat. No. 1,313,772 to Winans; U.S. Pat. No. 1,273,710 to Winans; U.S. Pat. No. 6,811,206 to Wagner; U.S. Pat. No. 5,556,156 to Kirk; U.S. Pat. No. 2,076,243 to Marshall et al.; U.S. Pat. No. 1,163,632 to Anderson; U.S. Pat. No. 950,038 to Bliss; U.S. Pat. No. 930,641 to Brethouwer; U.S. Pat. No. 2,367,541 to Troendle; U.S. Pat. No. 6,288,511 to Porter et al.; and, U.S. Pat. No. 1,800,514 to Dupre. Foldable vehicle tops or enclosures have also been used on automobile vehicles or convertables, and even in conjunction with horse drawn carriages.

There is a desire to have a foldable vehicle top that is easy to assemble and use and which effectively covers the top of a vehicle. Being able to quickly retract or fold the top is important for operators. There is also a need to have the top conveniently stored when not needed or desired. Being able to quickly extend and unfold the top is also desired to prepare for impending inclement weather.

The present invention provides a novel vehicle and vehicle top support device. The device includes a support device used in conjunction with a vehicle top enclosure for enclosing a top portion of a motorized vehicle, the support device comprising a front catch positioned forward a steering mechanism of the vehicle and a first arm pivotally connected to the device, the first arm including a telescoping vehicle front connecting portion, the front connecting portion configured to engage the front catch. Further aspects include a tensioner configured with the first arm to engage the catch. A pliable cover may be included to complete the top enclosure and associated vehicle. Numerous other advantages and novel features of the present invention are disclosed.

SUMMARY OF THE INVENTION

The present invention is directed toward a vehicle top enclosure comprising a support device comprising a first arm having a vehicle front connecting portion and an opposite mounting portion, the mounting portion pivotally connected to a sliding mount, the sliding mount slidably engaged with the device, and a tensioner connecting the sliding mount to the device under tension, and a pliable cover.

A further aspect of the invention includes a support device used in conjunction with a vehicle top enclosure for enclosing a top portion of a vehicle, the support device comprising a first arm having a vehicle front connecting portion and an opposite mounting portion, the mounting portion pivotally connected to a sliding mount, the sliding mount slidably engaged with the device, and a tensioner connecting the sliding mount to the device under tension.

A further aspect of the present invention includes a support device used in conjunction with a vehicle top enclosure for enclosing a top portion of a vehicle, the support device comprising a front catch positioned forward a steering mechanism of the vehicle, and a first arm pivotally connected to the device, the first arm including a telescoping vehicle front connecting portion, the front connecting portion configured to engage the front catch.

A further aspect of the present invention includes a vehicle equipped with a top enclosure as presented herein.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention of the particular embodiments described. On the contrary, the intention is to cover all modifications, equivalents, and alternatives falling within the spirit and scope of the invention and as defined by the appended claims.

DETAILED DESCRIPTION OF THE INVENTION

Figure 1:
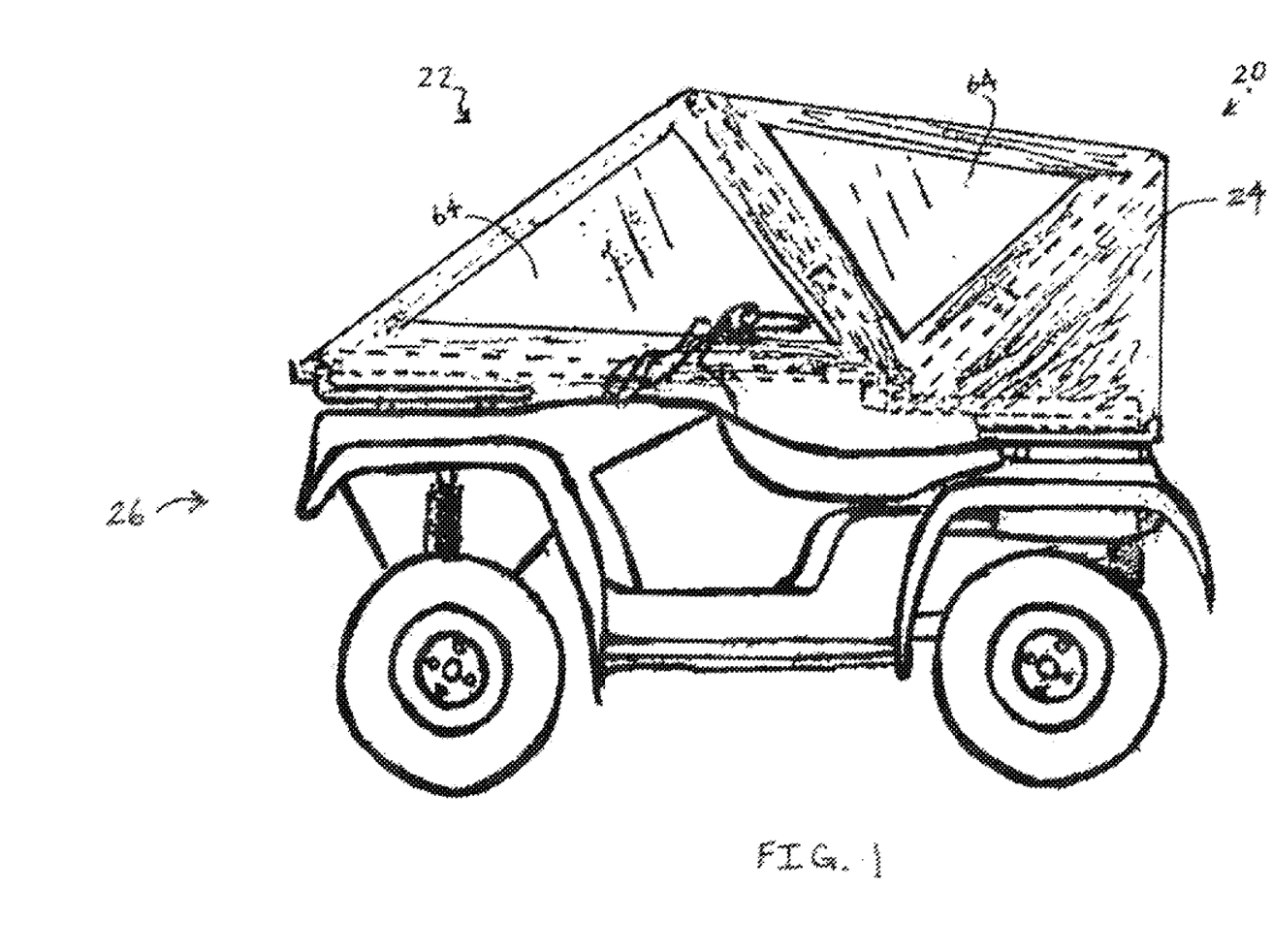
FIG. 1 is an elevation view of a vehicle having a vehicle top enclosure made in accordance with the present invention.
Figure 2:
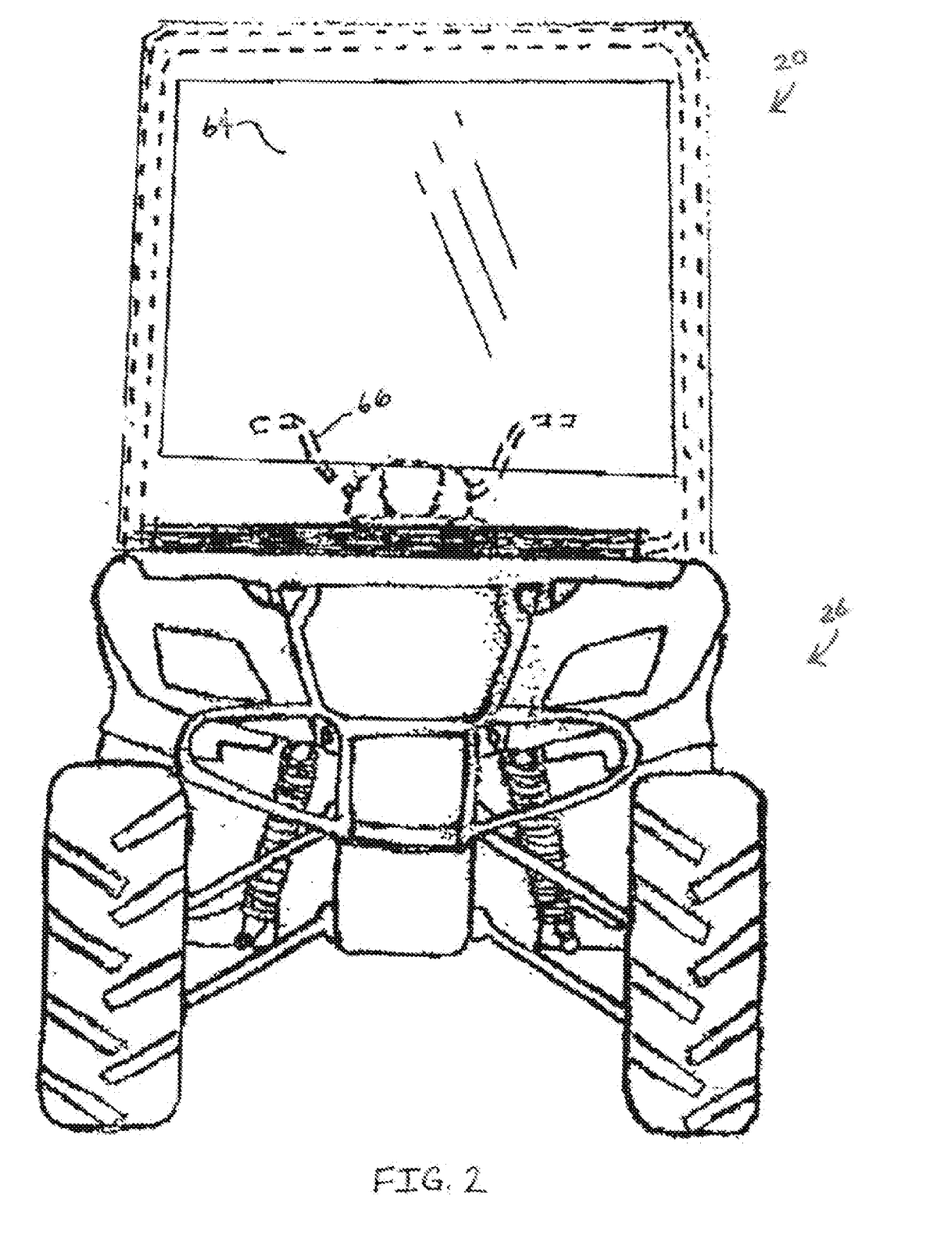
FIG. 2 is an end view of the vehicle of FIG. 1.

Referring now to FIG. 1 and FIG. 2, a vehicle top enclosure according to the present invention is generally depicted with reference to numeral 20. In one aspect, enclosure 20 is positioned atop vehicle 26 and generally includes a support 22 and a pliable cover 24. While vehicle 26 is shown as an ATV, it may be appreciated that enclosure 20 may be used in conjunction with other vehicles. Cover 20 covers at least a portion of, and preferably all of, the passenger or operator area of vehicle 26. A person may operate vehicle 26 while cover 20 is in the extended or unfolded position.

Figure 3:
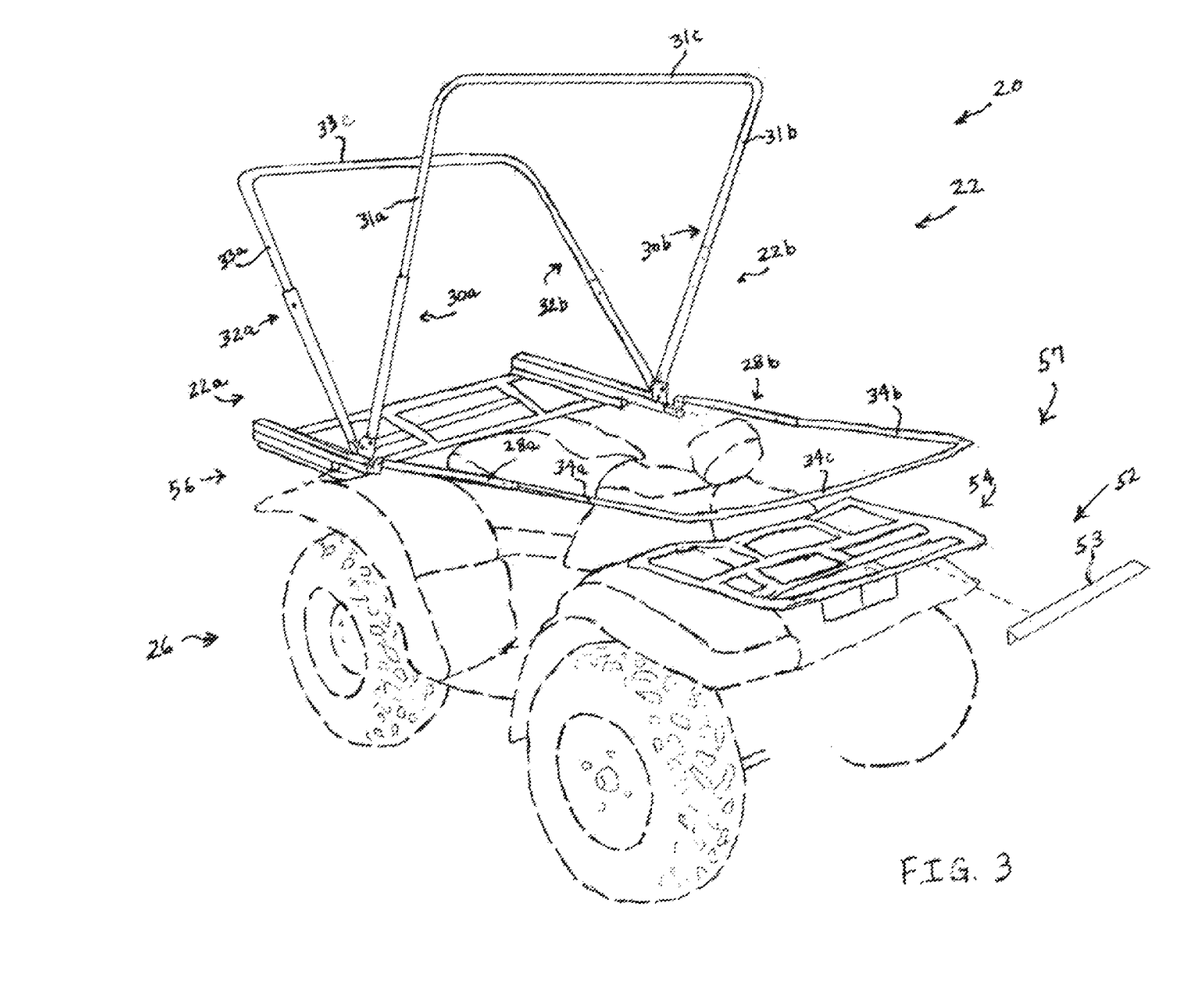
FIG. 3 is a perspective view of a vehicle equipped with a vehicle top support device of the present invention with the vehicle top enclosure nearly fully unfolded and with the pliable cover of the top enclosure removed for clarity.
Figure 4:
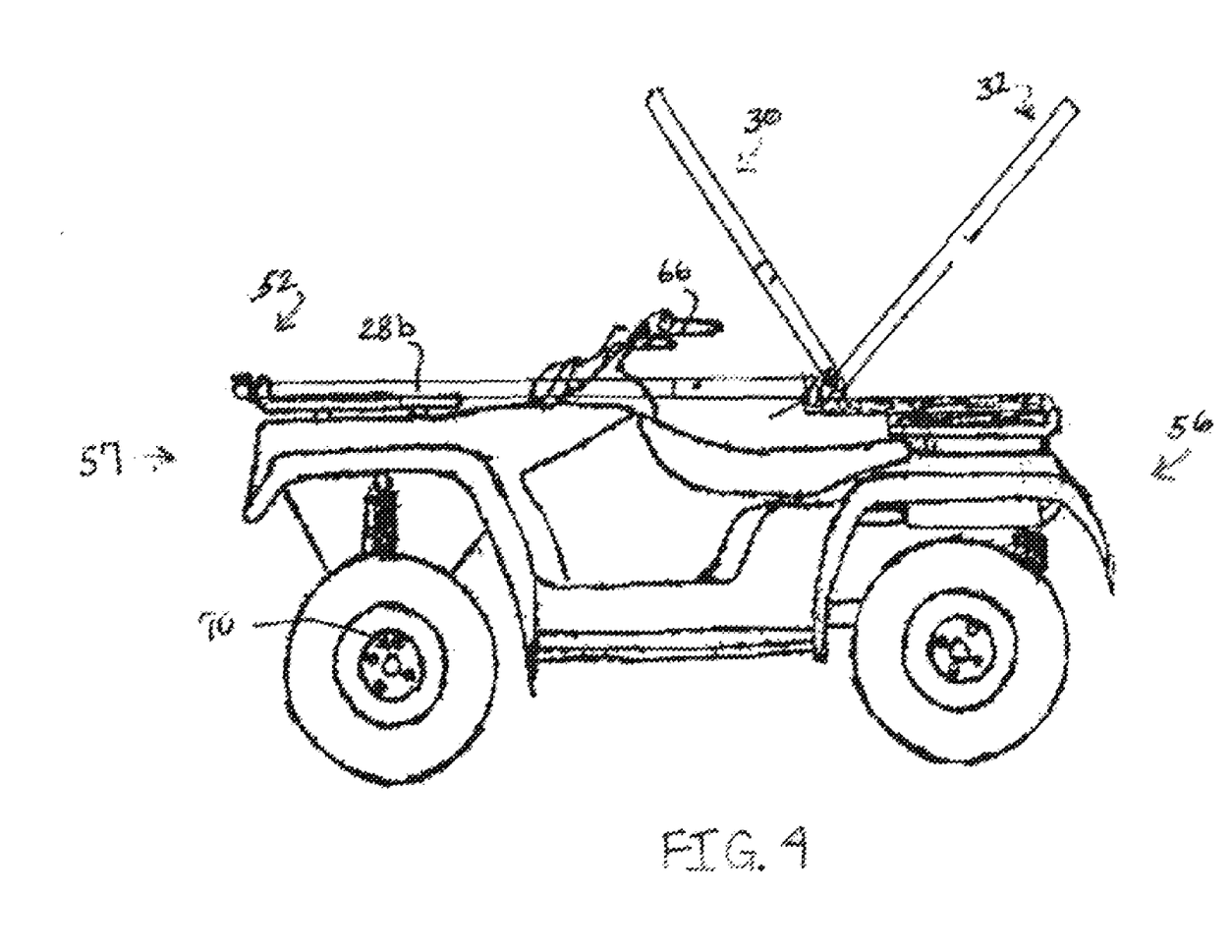
FIG. 4 is an elevation view of the vehicle of FIG. 1 the pliable cover of the top enclosure removed for clarity.
Figure 5:
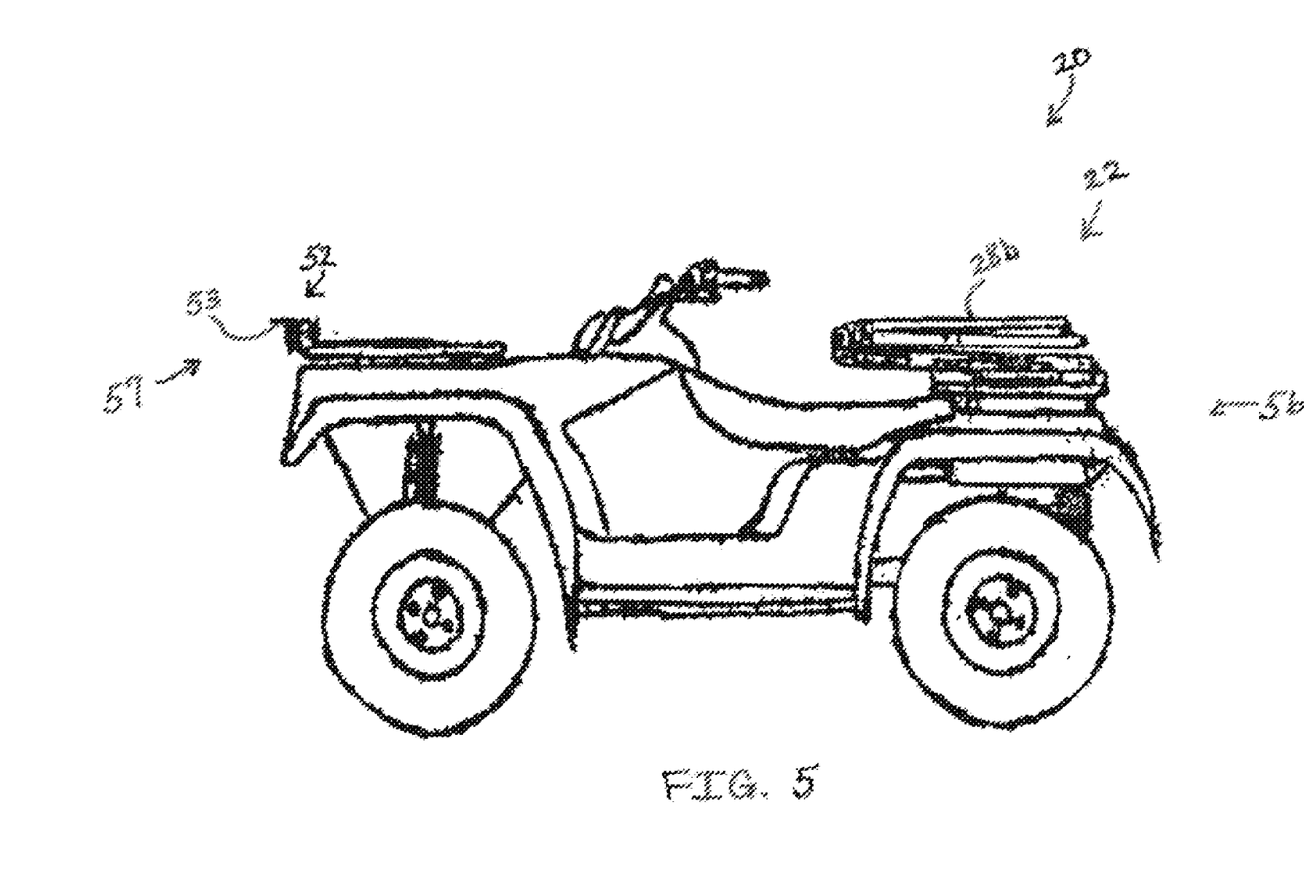
FIG. 5 is an elevation view of the vehicle of FIG. 1 with the vehicle top enclosure fully folded and with the pliable cover of the top enclosure removed for clarity.

FIG. 3 is a perspective view of vehicle 26 (shown in phantom) with enclosure 20 nearly fully unfolded and with pliable cover 24 removed for clarity. FIG. 4 shows enclosure 20 with support 22 fully extended, and FIG. 5 shows enclosure 20 fully folded, both with cover 24 removed for clarity.

Preferably support 22 includes a pair of oppositely disposed supports 22a, 22b. Supports 22a, 22b may be made from a variety of frame members such a round tubes, square tubes, angle iron, fiberglass tubes/strips, metal tubes/strips, plastic tubes/strips nylon tubes/strips, flat metal, etc. Cover 20 may have various shapes, such as rounded on top, flat on top, pointed on top, angled on top, etc.

Figure 6:
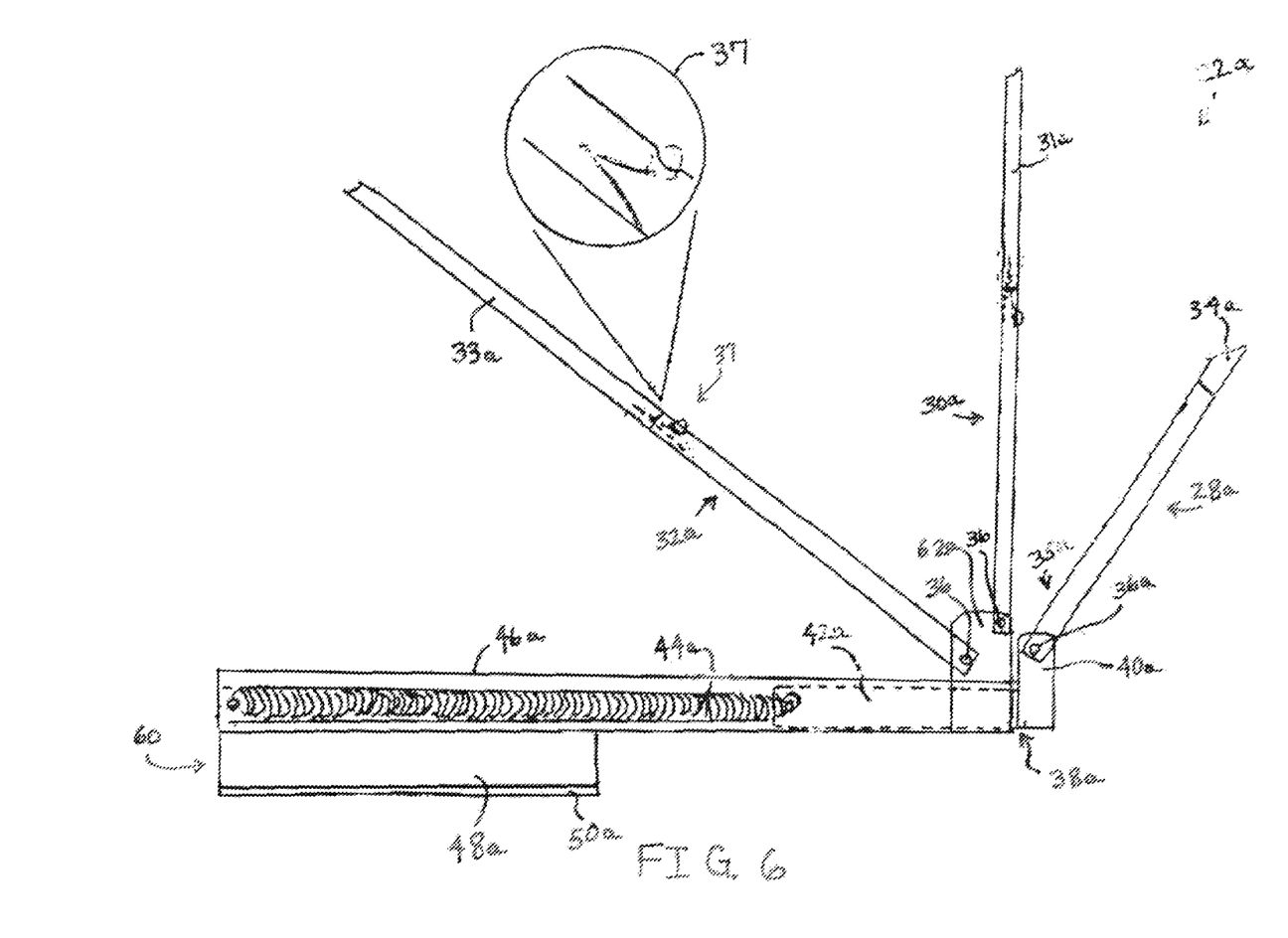
FIG. 6. is a partial and cut-away elevation view of a support of the vehicle top enclosure of the present invention.
Figure 7:
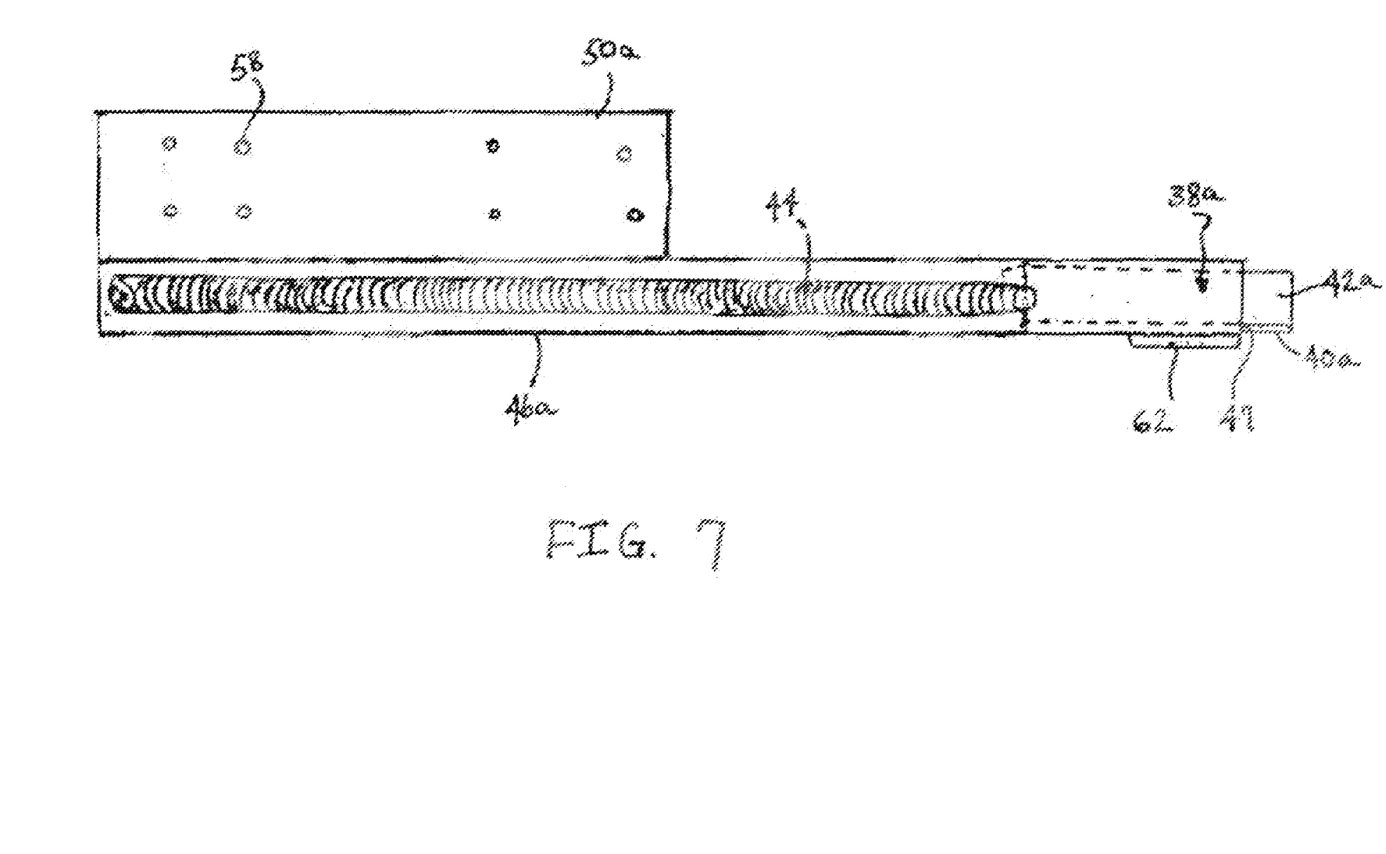
FIG. 7 is a partial and cut-away plan view of the support of FIG. 6.

As best shown with reference to FIGS. 3, 6, 7, enclosure 20 includes support 22 having a first arm 28, second arm 30 and third arm 32. First arms 28a, 28b, second arms 30a, 30b and third arms 32a, 32b, generally operate together for folding or unfolding of support 22. First arm 28 includes a vehicle front connecting portion 34 which connects to vehicle 26 at a front area 57 of vehicle 26, and preferably at an area forward of which may be occupied by a driver or passenger. Front connecting portion 34 may connect with a front catch 52 affixed to vehicle 26. Front catch 52 may alternatively include a structure integrally formed in vehicle 26, a rack portion 54 of vehicle 26, or a separate element added to the rack portion 54 or to front of vehicle 26. Front catch 52 may include an angled bracket 53, a clip, or a clasp or other catch means for catching front connecting portion 34. Catch means is not limited to an angled bracket 53 as shown. Front catch 52 may include but is not limited to an angled bracket 53 which is longer or shorter than that which is shown, and/or multiple shorter segments may be used, and/or the frame or rack portion of the vehicle may already include a front catch. Some models of ATVs have a front 57 which is already configured to receive a front connecting portion 34, thus the existing structure, which may include a rack, may sufficiently operate as a front catch 52. In other instances a separate catch 52 is to be added or the front end is to be manipulated or configured with an adapter. Front catch 52 may be made of metal or hardened plastic or other material to sufficiently hold or resist front connecting portion 34.

Preferably front connecting portion 34a, 34b join together at connecting portion 34c. Front catch 52 receives front connecting portion 34c. Front connecting portion 34c also operates as a bridging member and also assists a user in moving first arms 28a, 28b in unison. While front connecting portion 34a may be integrally or rigidly connected with first arm 28a, preferably vehicle connecting portion 34a telescopes within first arm 28a for convenient storage and use. Preferably portion 34a locks into position when extended from first arm 28. A latch, such as a spring latch or other latching mechanism, locks portion 34a into extended position as desired.

First arm 28 includes mounting portion 35a located opposite front connecting portion 34a. Mounting portion 35a of first arm 28a operates with tensioner 44a. In one aspect, mounting portion 35a connects to a sliding mount 38 which in turn engages tensioner 44a. Preferably first arm 28a is pivotally connected to sliding mount 38a at a pivot 36. Sliding mount 38 may include sliding mount first arm connector 40a and sliding mount tensioner connector 42a. While connector 40a may be integrally connected to mount 38a, as shown in FIG. 7 connector 40 is affixed to sliding mount tensioner connector 42a. Tensioner connector 42 a may be a tube element that inserts within brace 46a. Connector 42a slidably engages with brace 46a. First arm connector 40a preferably abuts brace 46 at brace lip 47. Such abutting engagement prevents sliding mount 38 from retracting within brace 46 due to tension imparted by tensioner 44a. Tensioner 44 may include a spring, bungee cord, or other tensioning mechanism preferably continually biased to retract sliding mount 38 toward a rear of vehicle 26. Brace 46 is affixed to vehicle 26. While brace 46 may be affixed directly to vehicle 26, preferably brace 46 is connected to bracket 48. Bracket 48 is preferably connected to plate mount 50. Preferably brace 46 is welded to bracket 48 which is welded to plate mount 50. Plate mount 50 may be affixed to vehicle 26 through mounting apertures 58 or other mechanism. Mount 50 may be affixed with nuts and bolts or other hardware. Vehicle 26 may be prepped with an alternative mount 50 or bracket 48 to engage with or to connect brace 46. While brace 46 is preferably made of metal and is of a tubular construction, other materials and configurations are possible. A rectangular tube is desired.

Second arm 30 and third arm 32 are connected to main arm connector 62. Preferably connector 62 is in fixed position with respect to vehicle 26. Preferably second arm 30a and third arm 32a are pivotally connected at pivots 36. Preferably second arm 30 includes a second arm extender 31 which extends or telescopes from arm 30. Preferably a latch, such a spring latch 37 or other latch mechanism or push button mechanism latches extender 31 in an extended position. Preferably third arm 32 includes a third arm extender 33 which extends or telescopes from arm 32. Preferably a latch, such a spring latch 37 or other latch mechanism or push button mechanism latches extender 33 in an extended position. Second arm extenders 31a, 31b join together at bridge 31c. Third arm extenders 33a, 33b join together at bridge 33c. Cover 24 is held in position upon bridge 33c, 31c and connecting portion 34c. Cover 24 is preferably pliable and preferably made of waterproof or water resistant flexible sheet material. Preferably cover 24 includes window portions made from clear or relatively clear and see through material. Windows 24 may be opened or furled as desired.

When a user desires to position enclosure 20 in a protecting manner above the vehicle top, arm extenders 31c, 33c, and connecting portion 34c are manually extended from respective third arms 32, second arms 30 and first arms 28. Typically a user may exit the vehicle and stand to the rear 56 of vehicle as shown in FIG. 5. After becoming familiar with the workings of the enclosure 20, a user may be able to position the enclosure 20 while staying in the occupant area of the vehicle. Once the extenders 31c, 33c, and 34c have been extended, and while seated on the vehicle in the operating position, the user may "flip-over" the support. Specifically, a user grasps first arms 28a, 28b (or extenders 31, 33, 34) at either side of vehicle 26 and then rotates them overhead in a forward direction (clockwise in view of FIG. 3) (counter-clockwise in view of FIG. 4). So that first arm 28 may connect to front 57 of vehicle 26, a user may extend first arm 28 by applying force opposite tensioner 44. As tensioner 44 extends toward front 57, front connecting portion 34 engages with front catch 52. Upon release of first arm 28 (or front connecting portion 34), tensioner 44 retracts causing front connecting portion 34c to catch with front catch 52. Portion 34c is maintained in a tension contact with catch 52 so that support 22 is secured in a completely unfolded position. Forces due to travel including forces such as wind and rain or contacts with brush or branches will typically not be able to release front arm 28 from vehicle front 57. Vehicle 26 may then be enjoyed even in poor weather. Importantly, when a user desires to refold enclosure 20, or to quickly exit vehicle 20, he may grasp first arms 28a, 28c (or front connecting portion 34), apply a force counter to tensioner 44 in order to release support from front catch 52 or other catch means and thereby rotate support 22 in a counter-clockwise direction in view of FIG. 3.

Adjustment of tensioner 44 may be made by use of a sliding clamp positioned on sliding mount 38. Also, front connecting portion 34 may extend to be locked at various positions to accommodate a desired reach which results in either more or less stretch of tensioner 44. As first arm 28 is rotated forward, second arm 30 and third arm 32 follow in the rotation due to mutual engagement with cover 24. As arm 28 rotates forward, arm 30 follows. After use of enclosure 20 in unfolded mode, a user may retract arm extenders 31, 33, 34, fold support into folded mode as shown in FIG. 5, secure pliable cover with a wrap or other means, and enjoy use of vehicle 26 with enclosure stored in the rear 56. Enclosure 20 works especially well in conjunction with an ATV since the user may simultaneously grasp both first arms 28a, 28b without undue effort.

Front catch 52 is preferably positioned forward of steering mechanism 66, and more preferably forward of front axle 70 of vehicle 26, and most preferably adjacent the forward-most portion of vehicle 26 as shown in FIG. 4. Such configuration provides for increased protection of the operator and vehicle 26. Steering mechanism 66 may include a steering wheel, handles, or other steering means. Front catch 52 is positioned below an uppermost level of steering mechanism 66 as generally shown in FIG. 4. First arm 28 aligns generally horizontally when engaged with front catch 52. The pivoting end of first arm 28, such as at vehicle mounting portion 35, and front catch 52, define a plane that is aligned generally horizontal.

Bracket 48 is preferably a tubular member having opening 60 positioned at a terminal end. An accessory tube (not shown) may be inserted into bracket at opening 60. A pair of accessory tubes may be inserted into brackets 48a, and 48b to accommodate attachment of accessory items at the rear of the vehicle 26. Such accessory items may include hunting, fishing, or work equipment, such as an auger holder, fishing equipment mounts, etc.

Figure 8:
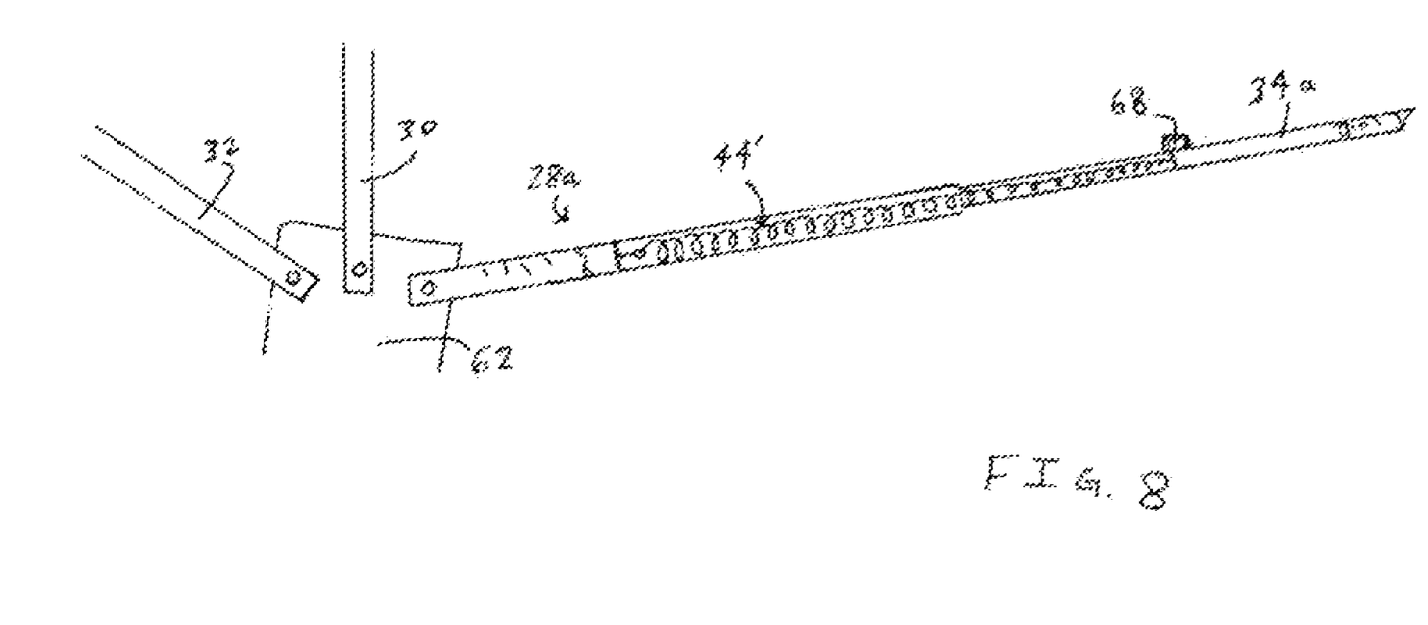
FIG. 8 is a partial and cut-away side view of a support device made in accordance with an alternative aspect of the present invention.

In a further aspect of the invention as shown with reference to FIG. 8, tensioner 44' may be inserted within first arm 28 (or within front connecting portion 34, or both). A user may extend connecting portion 34 to engage with front catch 52. Tensioner 44' imparts a retracting force toward rear 56 to maintain portion 34 in tensioned engagement with catch 52. To take down or fold enclosure 20, a user applies a force to portion 34 opposite the force of tension caused by tensioner 44'. As connecting portion 34c clears front catch 52, the user may rotate first arm 28 counter-clockwise (as viewed in FIG. 3, FIG. 8). In such aspect first arm 28 may be pivotally connected to main arm connector 62. A slide adjustment mechanism 68 may be included with first arm 28/34 to adjust the tension of tensioner 44'. Other adjustment mechanism may also be used. Multiple tubes may be used in conjunction with first arm 28/34 in order to telescope an appropriate distance to engage with catch 52. Alternatively and while not preferred, tensioner 44' may be configured to apply a tension force outward in an extending bias such that connecting portion 34 is biased to extend outward to engage front catch 52. A user would then compress tensioner 44' toward rear 56 in order to disengage catch 52 and thereby rotate first arm 28 counter-clockwise to fold enclosure 20. A stop may be provided within or about first arm 28 so that contacting portion 34 does not extend too far. A tensioner or spring may be compressed to accommodate engagement of first arm 28 with vehicle. A spring loaded arm 28a, 28b may be equipped with a spring or bungee cord or other tensioner.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular TOP SUPPORT AND VEHICLE EQUIPPED WITH SAME as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A vehicle top enclosure comprising:
    a support device comprising:
        a first arm having a vehicle front connecting portion and an opposite mounting portion, said mounting portion pivotally connected to a sliding mount, said sliding mount slidably engaged with a brace; and
        a tensioner connecting said sliding mount to said brace under tension; and
    a pliable cover.

2. The vehicle top enclosure of claim 1 further comprising a front catch, said vehicle front connecting portion configured to engage with said front catch.

3. A support device used in conjunction with a vehicle top enclosure for enclosing a top portion of a vehicle, said support device comprising:
    a first arm having a vehicle front connecting portion and an opposite mounting portion, said mounting portion pivotally connected to a sliding mount, said sliding mount slidably engaged with a brace; and
    a tensioner connecting said sliding mount to said brace under tension.

4. The support device of claim 3 wherein said first arm is substantially rigid and said vehicle front connecting portion is telescopingly connected to said first arm.

5. The support device of claim 3 further comprising a second arm and a third arm each pivotally connected to a fixed position arm connector.

6. The support device of claim 3 further comprising a front catch, said vehicle front connecting portion configured to engage said catch.

7. The support device of claim 6 wherein said front catch is positioned forward of a steering mechanism of the vehicle.

8. The support device of claim 3 wherein said tensioner is positioned within a tubular brace, said brace mounted to a bracket having an opening.

9. A support device used in conjunction with a vehicle top enclosure for enclosing a top portion of a vehicle, said support device comprising:
- a front catch positioned forward of a steering mechanism of the vehicle; and
- a first arm pivotally connected to a sliding mount, said first arm including a telescoping vehicle front connecting portion, said front connecting portion configured to engage said front catch; and
- a second arm oppositely disposed from said first arm, and
- where said first and second arms are spring loaded.

10. The support device of claim 9 wherein said sliding mount is slidably engaged with said device and connected to a tensioner.

11. The support device of claim 9 wherein said first arm includes a tensioner positioned within said first arm and extending within said front connecting portion.

12. The support device of claim 9 wherein said first arm is pivotally connected to said device at a position rearward of the steering mechanism.

13. The support device of claim 9 wherein said front catch is positioned below an uppermost level of the steering mechanism, said first arm aligned generally horizontally when engaged with said front catch.

14. The support device of claim 9 wherein said front catch is located forward of a front axle of the vehicle.

15. The support device of claim 9 further comprising a pliable cover, said cover covering the entirety of the occupant portion of the vehicle.

16. The support device of claim 9 wherein said first arm has a length extending to said front catch.

17. The support device of claim 9 further comprising a second arm and a third arm each pivotally connected to a fixed position arm connector.

18. An enclosable vehicle comprising a vehicle, a pliable cover, and a cover support device made in accordance with claim 9.

* * * * *